June 23, 1931.  E. E. ROSAIRE  1,811,648
METHOD OF DETERMINING THE STRAIGHTNESS OF DRILL HOLES IN THE EARTH
Filed Jan. 5, 1929
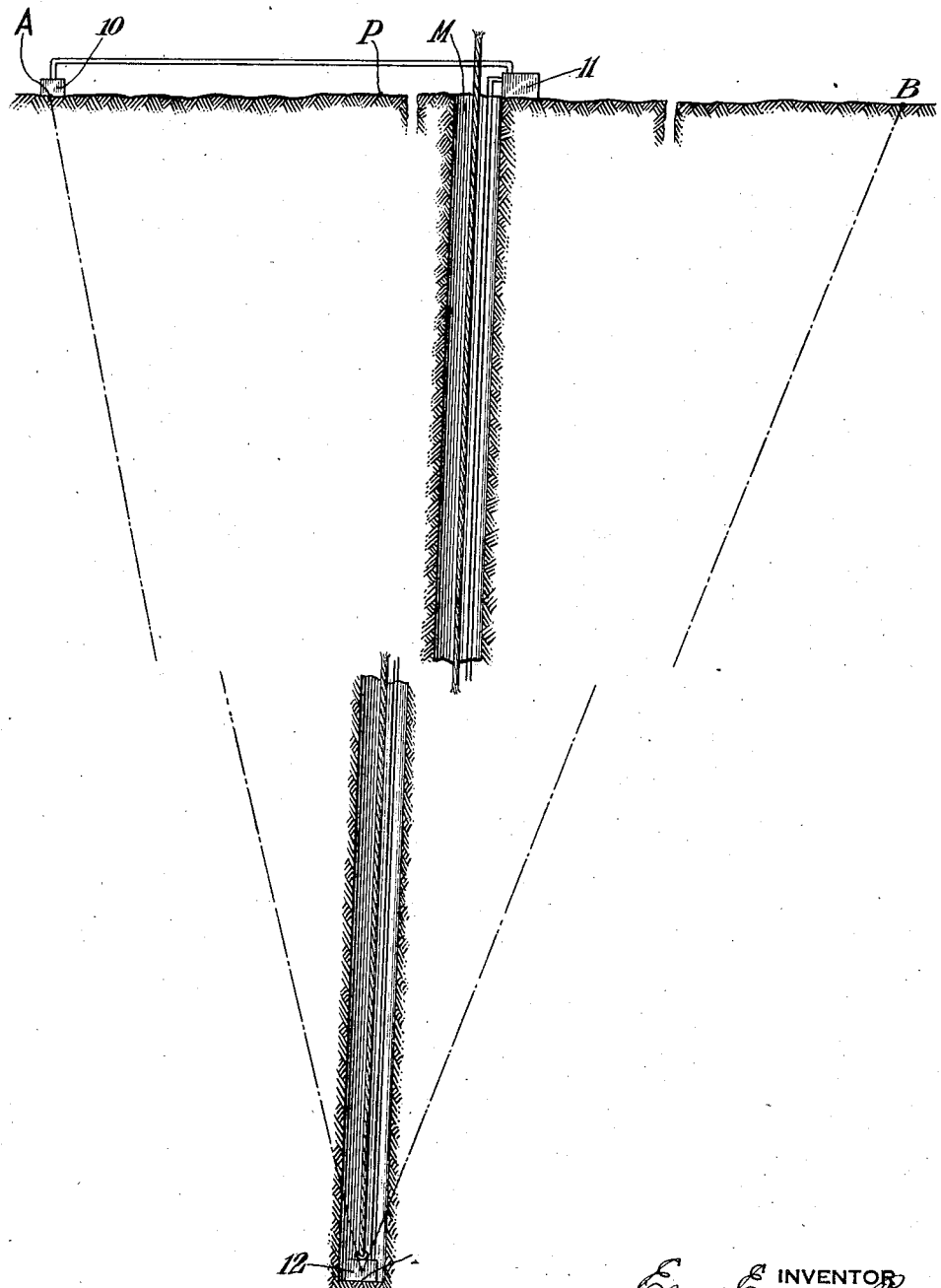
INVENTOR
Esme Eugene Rosaire
BY Kenyon & Kenyon
ATTORNEY Patented June 23, 1931

1,811,648

UNITED STATES PATENT OFFICE

ESME EUGENE ROSAIRE, OF FORT WORTH, TEXAS, ASSIGNOR TO GEOPHYSICAL RESEARCH CORPORATION, OF NEW YORK, N. Y., A CORPORATION OF NEW JERSEY

METHOD OF DETERMINING THE STRAIGHTNESS OF DRILL HOLES IN THE EARTH

Application filed January 5, 1929. Serial No. 330,542.

REISSUED

This invention relates to a method of determining the straightness of drill holes in the earth. When drilling deep holes into the earth in search of oil and gas, it is not an uncommon experience to find that such holes, instead of going straight downward are often crooked and deviate to a considerable extent from vertical. In some instances, it has been found that the bottoms of holes 4,000 feet deep are laterally offset as much as 800 feet from the vertical line passing through the top of the hole. So large a deviation may easily defeat the purpose of drilling a well in that the anticipated oil producing formation may be missed completely. In addition, such a deviation leads to ambiguous conclusions which may cause additional wells to be grossly mislocated.

Methods which have previously been used to determine the straightness of drill holes have not been satisfactory, due to the fact that the position of any point in the bore hole has been determined by the accumulated result of a series of observations. Any slight consistent error in these observations will be cumulative and as a result give a very erroneous value for the location of any point in the bore hole.

The object of this invention is a method of determining the straightness of drill holes in which the observation is taken directly at the point in question and any error in location will be directly proportional to the observation error and will not be cumulative.

According to the present invention, the location of the bottom of a drill hole or any point along the hole relative to two or more points on the surface is determined by the difference in time required for mechanical or sound waves to travel through the earth from the several points on the surface to the points in the drill hole or vice versa.

In the accompanying drawing, the single figure indicates a section through a drill hole, the deviation of which from vertical is to be determined.

A and B represent two points on the earth's surface. M designates the mouth of a drill hole and N designates the bottom of such drill hole, while P indicates the point on the earth's surface vertically above the point N. The mechanical or sound waves to be used in determining the position of the point N are preferably produced by setting off an explosive charge, means for setting off such charge being indicated by the reference character 10. An oscillograph recorder 11 is electrically connected to such means in such a way that its circuit is disturbed at the time that the explosion occurs. This results in the recording of the time of explosion on the uniformly moving film of the recorder. A geophone or other suitable detector 12 is arranged in the drill hole at the point N and is electrically connected to the oscillograph. When a disturbance arrives at the geophone, electrical impulses are generated which are also recorded by the oscillograph, due to the electrical connections between the two instruments.

An explosive charge set off at the point A produces an indication on the oscillograph of the time of the explosion and the arrival of the waves at the point N produces another indication on the oscillograph by means of which the time of travel of the waves from the point A to the point N may be determined. In a similar manner, the time of travel of sound waves from the point B to the point N may be determined. If a disturbance is produced at A and received at N and the time of travel from AN noted by means of the oscillograph and a similar disturbance is produced subsequently at B and other similar points and the times of travel observed, a determination may be made of the position of the point N relative to the various points at which the explosive charges were set off. The point N will be nearer A than B if the time of travel from A to N is less than the time of travel from B to N and vice versa. If the velocity of travel of the waves 11 is known, the distance AN and BN may be calculated and the position of the point N relative to the points A and B can be determined. Likewise the position of N may be determined relative to other points and its location fixed.

The determination of the position of the point N may be materially expedited by locating the points A and B on a line passing through the axis of the bore hole and preferably arranging such points at opposite sides of the bore hole equally distant therefrom. Under such circumstances, after the distances AN and BN have been calculated, the triangle ABN can be determined and the point N located relatively to the line AMB. Then, by repeating the operation described with two similar surface points situated on another line passing through N, the position of the point N with respect to the line connecting these two points may be determined and the position of the point definitely fixed.

Moreover, where the distance MN is known, the lateral shift of the point N relative to the point M may be determined approximately by the following equation:

$$X = \left(\frac{T_a^2 - T_b^2}{T_a^2 + T_b^2}\right)\left(\frac{\overline{MN}^2 + \overline{AM}^2}{2AM}\right)$$

in which X is the projection on the line AB of the distance MP, $T_a$ is the time of travel from A to N and $T_b$ is the time of travel from B to N. If the two lines on which the points of explosion have been selected are perpendicular to each other, the resultant of the two values of X determined by means of the above equation will give the exact location of the point P and by finding the location of a plurality of points at different depths the deviation of the drill hole from vertical may be determined. The distance PN, that is, the vertical distance from the earth's surface to the geophone 12, may be determined by means of the geometrical proposition that the square of the hypothenuse of a right triangle is equal to the sums of the squares of the other two sides. After the point P has been located, the distance PM is known and the distance MN is known from the length of the cable let down into the bore. Therefore, the distance PN can be determined in this way and the deviation at any depth may be determined.

By taking measurements from more than two points on each line as AMB, the position of the point N can be determined without knowing the depth of the hole or the velocity of propagation of the waves. This is done by algebraically determining the best hyperbola for the points on a graph obtained by plotting horizontal distances along the line AMB as abscissæ travel times as ordinates for the several points. The abscissa of the minimum time point on the hyperbola gives the horizontal position of N. In practice, it is customary to take from six to twelve points along the line AMB as successive sources of sound and respectively observing the travel times. The observed data is plotted on a graph as above described and the best hyperbola is obtained by algebraic determination and the use of the method of least squares in the calculations.

Although it is preferable to select points of explosion lying on perpendicular lines intersecting the axis of the bore hole, the method above described may be used with explosion points selected at random with respect to the bore hole. It is necessary only to determine the times of travel between several points on the earth's surface and the point the position of which is to be determined. Then, as above outlined, the position of the point in the bore hole may be determined relative to the several points on the earth's surface. By determining the position of a plurality of points in the bore hole, the deviation from vertical of a bore hole may readily be determined.

I claim:

1. The method of determining the deviation from vertical of a bore formed in the earth which comprises producing sound waves at different points on the earth's surface and recording the time intervals required by the sound waves to travel from each of said points to a selected point in the bore below the earth's surface.

2. The method of determining the deviation from vertical of a bore formed in the earth which consists in producing sound waves at points on the earth's surface equidistant from the bore, and recording the time intervals required by the sound waves to travel from each of said points to a selected point in the bore below the earth's surface.

3. The method of determining the deviation from vertical of a bore formed in the earth which consists in producing sound waves at points on the earth's surface lying on a line intersecting said bore, and recording the time intervals required by the sound waves to travel from each of said points to a selected point in the bore below the earth's surface.

4. The method of determining the deviation from vertical of a bore formed in the earth which consists in producing sound waves at points on the earth's surface equidistant from said bore and lying on a line intersecting said bore, and recording the time intervals required by the sound waves to travel from each of said points to a selected point in the bore below the earth's surface.

5. The method of determining the deviation from vertical of a bore formed in the earth which consists in producing sound waves at points on the earth's surface lying on perpendicular lines intersecting said bore, and recording the time intervals required by the sound waves to travel from each of said points to a selected point in the bore below the earth's surface.

6. The method of determining the deviation from vertical of a bore formed in the earth which consists in producing sound waves at points on the earth's surface equidistant from the bore and lying on perpendicular lines intersecting said bore and recording the time intervals required by the sound waves to travel from each of said points to a selected point in the bore below the earth's surface.

7. The method of determining the deviation from vertical of a bore formed in the earth which comprises producing sound waves at points on the earth's surface equidistant from the bore, recording the time intervals required by the sound waves to travel from said points to a selected point in the bore below the earth's surface, and calculating the position of said last named point from said recorded time intervals, the known distance of said surface points from the mouth of the bore and the known distance of the selected point from the mouth of the bore.

In testimony whereof, I have signed my name to this specification.

ESME EUGENE ROSAIRE.